United States Patent [19]

McKaveney et al.

[11] 4,173,687

[45] Nov. 6, 1979

[54] CURRENT GENERATING CELL WITH ALLOY ANODE

[75] Inventors: James P. McKaveney, Claremont; Martin A. Prieto, Diamond Bar, both of Calif.

[73] Assignee: Occidental Research Corporation, Irvine, Calif.

[21] Appl. No.: 917,167

[22] Filed: Jun. 20, 1978

[51] Int. Cl.$^2$ ............................................. H01M 4/36
[52] U.S. Cl. ..................................... 429/218; 429/221
[58] Field of Search ................................ 429/218, 221

[56] References Cited

U.S. PATENT DOCUMENTS

| 3,673,116 | 6/1972 | Richter | 429/221 X |
| 3,892,960 | 9/1976 | Hoekje et al. | 429/218 X |
| 3,961,987 | 6/1976 | Mund et al. | 429/221 X |
| 4,049,879 | 9/1977 | Thompson et al. | 429/221 X |

Primary Examiner—Charles F. LeFevour
Attorney, Agent, or Firm—Barry A. Bisson

[57] ABSTRACT

Anodes for current generating cells having good corrosion resistance, voltage stability and long life, especially in primary current generating cells, are described. The anodes comprise an anode composition having from about 20 to about 90 weight percent of the first constituent selected from the group consisting of iron and silicon and at least about 10 weight percent of a second constituent different from the first constituent and selected from the group consisting of molybdenum, tungsten, vanadium, niobium, titanium, phosphorus, and silicon. Anode compositions containing iron and a second constituent other than silicon may also contain up to about 10 weight percent silicon.

31 Claims, No Drawings

CURRENT GENERATING CELL WITH ALLOY ANODE

BACKGROUND

The present invention relates to anode materials for current generating cells, especially to anode materials for primary current generating cells.

Current generating cells having iron anodes have been described in *Alkaline Storage Batteries* by S. Faulk et al (New York: John Wiley & Sons, Inc., 1969). Such iron anodes are mixtures of iron metal and iron oxides.

U.S. Pat. No. 4,024,322 to McKaveney describes silicon alloy anodes for use in current generating cells which comprise silicon and a highly active metal selected from the group consisting of calcium, barium, magnesium, cerium, lanthanum, manganese, strontium, lithium, sodium, and potassium. U.S. Pat. No. 3,982,960 to Hoekje et al describes non-consumable silicon alloy cathode current collectors for secondary, i.e., rechargeable, electrochemical cells, in which silicon is doped with nitrogen, boron, phosphorus, or mixtures thereof, and alloyed with manganese, chromium, iron, cobalt, nickel, molybdenum, and mixtures thereof.

There remains a need for low cost alloy anodes of silicon, iron, or both which have good corrosion resistance, voltage stability, and long life, particularly in primary cells intended for long term applications involving low current drain.

SUMMARY OF THE INVENTION

In accordance with the present invention, current generating cells are provided that include anodes containing anode compositions which comprise from about 20 to 90 weight percent of a first constituent selected from the group consisting of iron and silicon and at least about 10 weight percent of a second constituent different from the first constituent and selected from the group consisting of molybdenum, tungsten, vanadium, niobium, titanium, phosphorus, and silicon. Anode compositions of the present invention containing iron and a second constituent other than silicon may also contain up to about 10 weight percent of silicon.

DETAILED DESCRIPTION

Anode compositions used in current generating cells of the present invention comprise from about 20 to 90 weight percent of a first constituent selected from the group consisting of iron and silicon and at least about 10 weight percent of a second constituent different from the first constituent and selected from the group consisting of molybdenum, tungsten, vanadium, niobium, titanium, phosphorus, and silicon. When the first constituent is iron and the second constituent is other than silicon, the anode composition preferably also comprises as a third constituent up to about 10 weight percent silicon. Preferably, the anode compositions consist essentially of said first, second, and third (if any) constituents, although minor amounts of other materials that do not adversely affect the properties of the anode compositions can also be present, such as aluminum, carbon, chromium, copper, manganese, nickel, and the like. The second constituent is preferably present in the anode compositions in a proportion of 25 to 75 weight percent. All percentages herein are by weight of anode composition.

In preferred anode compositions for use in practice of the present invention, the first constituent is iron and the second constituent is selected from the group consisting of molybdenum, vanadium, phosphorus, and silicon. When the second component is other than silicon, these preferred compositions also contain silicon in a proportion of up to about 10 weight percent, e.g., from about 1 to about 5 weight percent.

Particularly preferred is an anode composition consisting essentially of from about 25 to about 75 weight percent iron, from about 75 to about 25 weight percent molybdenum, and from 0 to about 5 weight percent silicon. More preferably, the molybdenum is present in a proportion of from about 50 to about 65 weight percent.

When the first constituent is silicon, the anode composition can consist essentially of silicon in a proportion of from about 20 to about 40 weight percent and a second constituent selected from the group consisting of molybdenum, niobium, and tungsten.

The formation of anode compositions for use in accordance with this invention is conveniently effected by carbon reduction of the corresponding oxides, such as iron oxide and silica, in a submerged-arc electric furnace of the type used in the ferroalloy industry. Anode compositions in accordance with this invention include ferroalloys such as ferromolybdenum, ferrosilicon, ferrophosphorus, ferrotungsten, and ferrocolumbium (ferroniobium), etc. which are made commercially for use as additives in steel making. Other means known to those skilled in the art for forming alloys and alloy-like compositions can be used, such as vacuum melting with induction heating of the pure elemental forms in the desired compositional ranges. Techniques for preparing electrochemically active metals, alloys, metal oxides and the like are described in the aforesaid *Alkaline Storage Batteries*.

Anodes for use in current generating cells in accordance with the present invention comprise at least one anode composition as described above and can be formed by any technique known in the art. The anode can be a rod, bar, plate or the like formed from such an anode composition by casting. Anode composition of the present invention can be reduced to fine particle size, for example 100 to 2000 microns, shaped to the configuration of the desired anode, and sintered under an inert atmosphere or vacuum. Powered anode composition can be mixed with an electrochemically inert, conductive material such as graphite and the mixture pressed to a desired shape, optionally with the addition of an organic binder resin. Alternatively, powdered anode composition can be adhered to a suitable electrochemically inert, conductive base, such as graphite, of the desired anode configuration.

Following preparation of the anode, surface oxide films can be removed, if present, by briefly immersing the anode in a dilute mineral acid solution such as 10% hydrochloric acid for 10 seconds to a minute or so.

Anodes prepared in accordance with this invention can be used in current generating cells with aqueous electrolytes having a pH from strongly acidic to strongly alkaline, such as solutions of mineral acids including sulfuric acid, solutions of alkali metal, alkaline earth metal and ammonium, inorganic and organic salts such as halides, sulfates, acetates, tartrates and mixtures thereof; and solutions of alkali metal hydroxides, preferably lithium, sodium, and potassium hydroxide, and mixtures thereof. Fused electrolytes such as molten alkali metal and alkaline earth metal halides and mixtures and eutectics thereof and organic electrolytes including solutions of organic metal salts in organic solvents can also be used.

Preferred are solutions having at least about 10 weight percent alkali metal hydroxide. It has been found that preferred anode compositions in accordance with the present invention are more resistant to corrosion, have better voltage stability, and give longer service than their constituent elements alone when used in anodes of highly alkaline cells.

The anodes are employed in current generating cells with conventional cathodes, notably those containing an oxide of lead, manganese, nickel, copper, mercury, or the like. The current generating cells can be primary cells, i.e., non-rechargeable cells, or secondary cells, i.e., rechargeable cells. It is presently preferred to employ the described anode compositions in primary cells having aqueous alkaline electrolytes.

EXAMPLE I

Current generating cells employing the anode compositions listed in Table 1, manganese dioxide as the cathode, and 40% potassium hydroxide as the electrolyte were assembled as described below. Initial open circuit voltages (O.C.V.) and closed circuit voltages (C.C.V.) were measured, and the cells were discharged under a constant load of 300 ohms. At the termination of discharge, the final open circuit voltage was measured. Discharge of a particular cell was terminated after a significant drop-off in potential occurred or when excessive electrode gassing was noted. In preparing each cell, between 2 and 3 grams of a powdered anode composition (minus 30 mesh) was packed into a cellulose thimble 55 millimeters long by 10 millimeters in diameter around a conductive graphite rod 6.3 millimeters in diameter by 77 millimeters long. A second cellulose thimble of the same size was packed with about 3.5 grams of electrolytic grade manganese dioxide around a graphite rod of the same size. The two electrodes were immersed in a jar containing 50 milliliters of 40 weight percent potassium hydroxide solution. Table 1 reports the results of these tests.

TABLE 1

ALLOY BATTERY TESTS

| Anode | Initial O.C.V. (Volts) | Initial C.C.V (Volts) | Final O.C.V. (Volts) | Discharge Time (Hours) |
|---|---|---|---|---|
| Fe—Mo—Si | 0.95 | 0.93 | 0.78 | 501 |
| Fe—V—Si | 0.97 | 0.96 | 0.44 | 391 |
| Fe—Ti—Si | 1.14 | 1.12 | 0.12 | 42 |
| Fe—P—Si | 1.01 | 1.00 | 0.35 | 354 |
| FeSi$_2$ | 1.06 | 1.03 | 0.35 | 214 |
| WSi$_2$ | 0.98 | 0.80 | 0.91 | 24 |
| NbSi$_2$ | 1.03 | 0.81 | 1.02 | 24 |
| MoSi$_2$ | 0.91 | 0.84 | 0.83 | 24 |
| Mo | 0.83 | 0.72 | 0.42 | 190 |
| Fe | 1.05 | 1.03 | 0.08 | 68 |

Especially noteworthy is the performance of the Fe—Mo—Si alloy anode composition compared with the performance of the pure Fe and of the pure Mo anodes. The alloy has a significantly longer life and better voltage stability than either of the pure metals alone.

Table 2 shows the proportions of constituents of the anode composition shown in Table 1. Each composition contains a substantial proportion, at least about 20 weight percent, of iron or silicon, and a substantial proportion at least about 20 weight percent, of molybdenum, vanadium, titanium, phosphorus, tungsten or niobium.

TABLE 2

COMPOSITION OF ALLOYS

| Alloy | Analysis, % |
|---|---|
| Fe-Mo-Si | 29.5 Fe, 67.2 Mo, 1.24 Si |
| Fe-V-Si | 21.6 Fe, 76.3 V, 1.17 Si, 0.52 Al |
| Fe-Ti-Si | 64.2 Fe, 31.5 Ti, 2.09 Si, 1.01 Al |
| Fe-P-Si | 69.9 Fe, 24.2 P, 1.22 Si, 2.48 Mn |
| FeSi$_2$ | 49.0 Fe, 49.2 Si, 1.02 Al |
| WSi$_2$ | 76.4 W, 23.4 Si |
| NbSi$_2$ | 62.5 Nb, 37.1 Si |
| MoSi$_2$ | 61.8 Mo, 37.2 Si |

EXAMPLE II

Cells were prepared as described in EXAMPLE I using 10 N H$_2$SO$_4$ as the electrolyte, MnO$_2$ as the cathode, and either an Fe—Mo alloy (31 wt % Fe, 67 wt % Mo) or an Fe—V alloy (22 wt % Fe, 76 wt % V) as the anode. The cells were discharged under a constant load of 300 ohms.

Open circuit voltages were obtained measuring the potential of each anode and cathode against a standard calomel electrode, and taking the difference between the potential of the MnO$_2$ cathode and the Fe—Mo or Fe—V anode. Cell voltages as a function of time of discharge are reported in Table 3 below.

TABLE 3

| Cell Voltage, O.C.V., volts | | Discharge Time |
|---|---|---|
| Fe-Mo | Fe-V | Hours |
| 1.03 | 1.33 | 0 |
| 0.88 | 1.08 | 120 |
| 0.82 | 0.43 | 240 |
| 0.80 | 0.40 | 360 |
| 0.29 | — | 480 |
| 0.06 | — | 600 |

Although the present invention has been described with reference to particular details and embodiments thereof, the particulars are intended to illustrate the invention, and many variations within the scope of the following claims will be apparent to those skilled in the art.

What is claimed is:

1. In a current generating cell having an anode, a cathode, and an electrolyte capable of electrochemically reacting with the anode and cathode to generate current, the improvement which comprises providing as the anode, an anode composition comprising from about 20 to about 90 weight percent of a first constituent selected from the group consisting of iron and silicon and at least about 10 weight percent of a second constituent selected from the group consisting of molybdenum, tungsten, vanadium, niobium, titanium, phosphorus, and silicon wherein said composition is in direct contact with the electrolyte for electrochemically reacting with said electrolyte.

2. The current generating cell of claim 1 wherein the first constituent is iron and the second constituent is selected from the group consisting of molybdenum, vanadium, phosphorus, and silicon.

3. The current generating cell of claim 1 wherein the first constituent is silicon and the second constituent is selected from the group consisting of tungsten, molybdenum, and niobium.

4. The current generating cell of claim 1 wherein the first constituent is iron and the second constituent is selected from the group consisting of molybdenum, tungsten, vanadium, niobium, titanium, and phosphorus, and wherein the anode composition further comprises up to about 10 weight percent silicon.

5. The current generating cell of claim 4 wherein the second constituent is selected from the group consisting of molybdenum, vanadium, and phosphorus.

6. The current generating cell of claim 1 which is a primary current generating cell having an aqueous alkaline electrolyte.

7. The primary current generating cell of claim 6 wherein the electrolyte is an aqueous solution of an alkali metal hydroxide.

8. The current generating cell of claim 1 wherein the anode composition is an alloy.

9. A primary current generating cell having an anode, a cathode, and an electrolyte capable of electrochemically reacting with the anode and cathode to generate current, wherein the anode comprises an anode composition of a first constituent consisting essentially of from about 20 to about 80 weight percent iron; and
at least about 20 weight percent of a second constituent selected from the group consisting of molybdenum, tungsten, vanadium, niobium, titanium, phosphorus, and silicon wherein the anode composition is in direct contact with the electrolyte for electrochemically reacting with said electrolyte.

10. The primary current generating cell of claim 9 wherein said second constituent is selected from the group consisting of molybdenum, vanadium, phosphorus, and silicon.

11. The primary current generating cell of claim 9 wherein said second constituent is molybdenum.

12. The primary current generating cell of claim 9 wherein said second constituent is vanadium.

13. The primary current generating cell of claim 9 wherein said second constituent is phosphorus.

14. The primary current generating cell of claim 9 wherein said second constituent is silicon.

15. The primary current generating cell of claim 9 wherein the electrolyte is an aqueous alkaline electrolyte.

16. The primary current generating cell of claim 9 wherein the cathode comprises an oxide of a metal selected from the group consisting of lead, manganese, nickel, copper, and mercury.

17. The primary current generating cell of claim 9 wherein the anode composition is an alloy.

18. A primary current generating cell having an anode, a cathode, and an electrolyte capable of electrochemically reacting with the anode and cathode to generate current, wherein the anode comprises an anode composition consisting essentially of from about 20 to about 80 weight percent silicon, and at least about 20 weight percent of a constituent selected from the group consisting of molybdenum, tungsten, vanadium, niobium, titanium, and phosphorus wherein the anode composition is in direct contact with the electrolyte for electrochemically reacting with said electrolyte.

19. The primary current generating cell of claim 18 wherein the anode composition has from about 20 to about 40 weight percent silicon.

20. The primary current generating cell of claim 18 wherein said constituent is selected from the group consisting of molybdenum, tungsten, and niobium.

21. The primary current generating cell of claim 18 wherein the electrolyte is an aqueous alkaline electrolyte.

22. The primary current generating cell of claim 18 wherein the cathode comprises an oxide of a metal selected from the group consisting of lead, manganese, nickel, copper, and mercury.

23. The primary current generating cell of claim 18 wherein the anode composition is an alloy.

24. A primary current generating cell having an anode, a cathode, and an electrolyte capable of electrochemically reacting with the anode and cathode to generate current, the anode comprising an anode composition consisting essentially of from about 25 to about 75 weight percent iron, from about 75 to about 25 weight percent molybdenum, and from 0 to about 5 weight percent silicon, wherein the anode composition is in direct contact with the electrolyte for electrochemically reacting with said electrolyte.

25. The primary current generating cell of claim 24 wherein the anode composition has from about 50 to about 65 weight percent molybdenum.

26. The primary current generating cell of claim 24 wherein the electrolyte is an aqueous alkaline electrolyte.

27. The primary current generating cell of claim 24 wherein the electrolyte is an aqueous acidic electrolyte.

28. The primary current generating cell of claim 24 wherein the cathode comprises an oxide of a metal selected from the group consisting of lead, manganese, nickel, copper and mercury.

29. The primary current generating cell of claim 24 wherein the anode composition is an alloy.

30. A primary current generating cell having an anode, a cathode, and an electrolyte capable of electrochemically reacting with the anode and cathode to generate current wherein the anode comprises an anode composition consisting essentially of from about 20 to about 80 weight percent iron;
at least about 20 weight percent of a second constituent selected from the group consisting of molybdenum, tungsten, vanadium, niobium, titanium, and phosphorus; and
from about 1 to about 10 weight percent silicon as a third constituent wherein the anode composition is in direct contact with the electrolyte for electrochemically reacting with said electrolyte.

31. The primary current generating cell of claim 30 wherein the anode composition is an alloy.

* * * * *